United States Patent
Yan et al.

(10) Patent No.: US 12,485,190 B2
(45) Date of Patent: Dec. 2, 2025

(54) NANOCARBON-IODINE CALCIUM ALGINATE MICROSPHERES AND PREPARATION METHOD AND APPLICATION THEREOF

(71) Applicant: NANJING DRUM TOWER HOSPITAL, Nanjing (CN)

(72) Inventors: Zhaoping Yan, Nanjing (CN); Xiangjun Yan, Nanjing (CN); Yongping Yan, Nanjing (CN); Haoya Sun, Nanjing (CN)

(73) Assignee: NANJING DRUM TOWER HOSPITAL, Nanjing (CN)

( * ) Notice: Subject to any disclaimer, the term of this patent is extended or adjusted under 35 U.S.C. 154(b) by 0 days.

(21) Appl. No.: 19/178,993

(22) Filed: Apr. 15, 2025

(65) Prior Publication Data
US 2025/0360232 A1   Nov. 27, 2025

Related U.S. Application Data

(63) Continuation of application No. PCT/CN2024/118147, filed on Sep. 11, 2024.

(30) Foreign Application Priority Data

May 21, 2024  (CN) .......................... 202410630803.9

(51) Int. Cl.
| | | |
|---|---|---|
| A61K 49/04 | (2006.01) | |
| A61K 9/50 | (2006.01) | |
| A61K 41/17 | (2020.01) | |
| A61L 2/00 | (2006.01) | |
| B01J 13/14 | (2006.01) | |
| B01J 13/20 | (2006.01) | |

(52) U.S. Cl.
CPC ........ *A61K 49/0419* (2013.01); *A61K 9/5089* (2013.01); *A61K 41/17* (2020.01); *A61K 49/0438* (2013.01); *A61L 2/007* (2013.01); *B01J 13/14* (2013.01); *B01J 13/206* (2013.01); *A61L 2202/21* (2013.01)

(58) Field of Classification Search
CPC .. A61K 49/0419; A61K 41/17; A61K 9/5089; A61K 49/0438; A61L 2/007; A61L 2202/21; B01J 13/14; B01J 13/206
See application file for complete search history.

(56) References Cited

U.S. PATENT DOCUMENTS

| | | |
|---|---|---|
| 2009/0162440 A1 | 6/2009 | Xiaoping et al. |
| 2024/0197932 A1* | 6/2024 | Rice ........................ A61L 24/08 |

FOREIGN PATENT DOCUMENTS

| | | | |
|---|---|---|---|
| CN | 103432080 A | 12/2013 | |
| CN | 106620829 A | 5/2017 | |
| CN | 115192766 A | 10/2022 | |
| CN | 115227666 A | 10/2022 | |
| CN | 115463226 A | 12/2022 | |
| CN | 115845117 A | 3/2023 | |
| CN | 117085166 A | 11/2023 | |
| CN | 118512637 A | 8/2024 | |
| WO | WO 00/74650 | * 12/2000 | ................ A61P 7/04 |
| WO | 2024060825 A1 | 3/2024 | |

OTHER PUBLICATIONS

Zhang et al., international Journal of Biological Macromolecules vol. 47, Issue 3, Oct. 1, 2010, pp. 389-395. (Year: 2010).*
Qin Wang, et al., X-ray Visible and Uniform Alginate Microspheres Loaded with in situ Synthesized BaSO4 Nanoparticles for in vivo Transcatheter Arterial Embolization, J . . . Biomacromolecules, 2015, pp. 1-6, vol. 16 No. 4.
Jian Zeng, et al., Radiopaque and uniform alginate microspheres loaded with tantalum nanoparticles for real-time imaging during transcatheter arterial embolization, Theranostics, 2018, pp. 4591-4600, vol. 8 Issue 17.
Yi Hong-Fu, et al., Preparation of autoradiographic calcium alginate embolic microspheres, Journal of Functional Materials, 2006, pp. 1988-1990, vol. 37 No. 12.
Andrea L. Klein, et al., Nanoparticles as a Tool in Neuro-Oncology Theranostics, Pharmaceutics, 2021, pp. 1-23, vol. 13 No. 948.

* cited by examiner

*Primary Examiner* — Michael G. Hartley
*Assistant Examiner* — Leah H Schlientz
(74) *Attorney, Agent, or Firm* — Bayramoglu Law Offices LLC (57) ABSTRACT

A nanocarbon-iodine calcium alginate microspheres and a preparation method thereof are provided, the nanocarbon is added to the microspheres to enhance an imaging capability of iodine under X-ray, which is a good way to solve a problem that an embolic agent in clinical application cannot be imaged under X-ray. In addition, the preparation method is simple with good stability and safety. It is proved through experiments that the microspheres can be imaged under conventional interventional X-ray examination devices in CT and DSA, it is proved through animal experiments that the microspheres have good X-ray imaging performance and embolization effect.

7 Claims, 11 Drawing Sheets

FIG. 1A

Optical microscope: 10x magnification

FIG. 1B

Broken 10x

FIG. 1C

Broken 40x

NANOCARBON-IODINE CALCIUM ALGINATE MICROSPHERES AND PREPARATION METHOD AND APPLICATION THEREOF

CROSS REFERENCE TO THE RELATED APPLICATIONS

This application is a continuation application of International Application No. PCT/CN2024/118147, filed on Sep. 11, 2024, which is based upon and claims priority to Chinese Patent Application No. 202410630803.9, filed on May 21, 2024, the entire contents of which are incorporated herein by reference.

TECHNICAL FIELD

The present invention belongs to the field of medical material technologies, and in particular, relates to nanocarbon-iodine calcium alginate microspheres and a preparation method and an application thereof.

BACKGROUND

Embolic microspheres are commonly used embolic materials in transcatheter arterial chemoembolization (TACE) of primary liver cancer. Although there are many types of embolic microsphere materials available for clinical application, a common issue is that the materials cannot be imaged under X-ray. During an operation, an iodine-containing contrast agent is required to assist in imaging. A surgeon sees the contrast agent rather than an embolic agent, whereas a clinician actually wants to observe the embolic agent instead of the contrast agent, resulting in a disconnection between an intraoperative contrast agent and an imaging requirement of a therapeutic embolic material.

In current researches, barium sulfate calcium alginate microspheres (Wang Q, Qian K, Liu S, et al. X-ray visible and uniform alginate microspheres loaded with in situ synthesized BaSO4 nanoparticles for in vivo transcatheter arterial embolization[J]. Biomacromolecules. 2015 Apr. 13; 16(4):1240-6.), an imaging effect of which is slightly superior to that of calcium-based microspheres. However, a toxicity threshold of barium is low, which may limit its widespread use by clinicians. Tantalum nanoparticle calcium alginate (Zeng J, Li L, Zhang H, et al. Radiopaque and uniform alginate microspheres loaded with tantalum nanoparticles for real-time imaging during transcatheter arterial embolization[J]. Theranostics. 2018 Aug. 10; 8(17):4591-4600.), which is expensive, and toxicity thereof needs further clarification. Calcium alginate-lipiodol microspheres (YI Hong-fu, REN Dong-wen, BAO De-cai, et al. Preparation of autoradiographic calcium alginate embolic microspheres[J]. Journal of Functional Materials, 2006, 37(12): 1988-1990) have good imaging performance. However, after degradation, lipiodol becomes a liquid embolic material which may displace, making it less suitable for some organs, and a storage time thereof after preparation is limited, causing difficulty in clinical application.

Nano carbon powder is a new type of carbon-based nanomaterial with a good drug loading capacity, good biocompatibility, and controllable physical and chemical properties, gaining widespread application in the medical field in recent years. Application of the nano carbon powder in biomedical imaging: The nano carbon powder can achieve good dispersibility and biocompatibility through surface modification, and can serve as an imaging probe in an imaging technology. The nano carbon powder can be used as a raw material for an MRI contrast agent, where a high absorption efficiency and a high scattering efficiency of the nano carbon powder may enhance an imaging effect of a corresponding imaging technology. As a good drug carrier, the nano carbon powder is widely applied in pharmaceutical manufacturing. The nano carbon powder may be prepared into nano carbon powder-based biomaterials and biological tissue engineering materials for biomaterial repair and regeneration. In addition, the nano carbon powder can be further widely applied in production of artificial joints. Broad application prospects of the nano carbon powder are not limited to drugs, imaging, and materials, but also extend to a plurality of fields such as tumor treatment and artificial organ manufacturing (Klein A L, Nugent g, Cavendish J, geldenhuys W J, Sriram K, Porter D, Fladeland R, Lockman P R, Sherman J H. Nanoparticles as a Tool in Neuro-Oncology Theranostics. Pharmaceutics. 2021 Jun. 24; 13(7): 948.).

SUMMARY

Objective of the present invention: An objective of the present invention is to provide nanocarbon-iodine calcium alginate microspheres and a preparation method and an application thereof, to overcome an imaging problem of an embolic agent. Product stability is high, and a preparation process is simple, thereby implementing industrialization production and achieving high clinical application value.

To fulfill the purpose of the above invention, the invention provides the following technical solution:

The present invention provides nanocarbon-iodine calcium alginate microspheres, wherein the microsphere contains nano carbon powder, iodine, and calcium alginate, the iodine is located inside a calcium alginate microsphere, and the nano carbon powder is encapsulated inside the calcium alginate microsphere. The iodine loading efficiency of the microsphere is 35% to 50%, and a carbon loading efficiency is 30% to 50%.

The present invention also provides a preparation method of the nanocarbon-iodine calcium alginate microspheres, including the following steps:
(1) preparing an iodine-containing sodium alginate aqueous solution;
(2) preparing an aqueous solution containing a crosslinking agent;
(3) preparing a first suspension formed by nano carbon powder and liquid, and mixing and stirring the suspension with the iodine-containing sodium alginate aqueous solution prepared in step (1), to form a second suspension;
(4) placing the second suspension obtained in step (3) in a syringe, and injecting the second suspension into the crosslinking agent aqueous solution prepared in step (2), to obtain the nanocarbon-iodine calcium alginate microspheres, wherein the crosslinking agent aqueous solution is in a stirring state;
(5) filtering and drying the nanocarbon-iodine calcium alginate microspheres obtained in step (4); and
(6) sieving the microspheres obtained in step (5) and sterilizing the microspheres through cobalt-60 irradiation.

Preferably, the liquid is one or more of water, anhydrous ethanol, propanol, or tween-80.

Preferably, the crosslinking agent is a bivalent metal cationic compound, and is selected from one or more of magnesium chloride, zinc chloride, copper chloride, barium chloride, ferrous sulfate, magnesium sulfate, zinc sulfate, calcium chloride, calcium hypochlorite, calcium bromide, or calcium iodide.

Preferably, the iodine-containing sodium alginate aqueous solution is a solution obtained by dissolving potassium iodide and sodium alginate in water, a mass ratio of potassium iodide to sodium alginate is (5-10):(0.1-2.0), and a mass concentration of the sodium alginate aqueous solution is 10-20 mg/mL.

Preferably, a mass concentration of the crosslinking agent aqueous solution is 20-150 mg/mL.

Preferably, a mass of nano carbon powder in each milliliter of the first suspension is 0.05-0.15 g; and a mass ratio of sodium alginate to the nano carbon powder in the second suspension is (2-3):1.

Preferably, a particle size of the nano carbon powder is 2-500 nm.

Preferably, the diameters of microspheres sieved in step (6) are 20-900 μm.

The present invention also provides an application of the nanocarbon-iodine calcium alginate microspheres in preparation of an imaging embolic material.

Beneficial Effect

The present invention provides nanocarbon-iodine calcium alginate microspheres and a preparation method thereof. Nanocarbon is added to the microspheres to enhance an imaging capability of iodine under X-ray, which is a good way to solve a problem that an embolic agent in clinical application cannot be imaged under X-ray. In addition, the preparation method is simple with good stability and safety. It is proved through experiments that the microspheres can be imaged under conventional interventional X-ray examination devices in CT and DSA. Therefore, (1) radiological visibility is achieved, thereby facilitating positive evaluation of a clinical embolization effect; (2) the microspheres are conducive to diagnostic confirmation of etiology and suspected post-interventional ectopic embolism, playing a decisive role in related disease treatment; (3) a clinical operation procedure can be performed in real time with precision, and the nanocarbon-iodine calcium alginate microspheres can solve an imaging problem under X-ray in a transcatheter arterial chemoembolization procedure; (4) it is proved through animal experiments that the microspheres have good X-ray imaging performance and embolization effect; and (5) nano carbon powder holds potential for future dual functionality, including drug loading and drug delivery.

BRIEF DESCRIPTION OF THE DRAWINGS

FIGS. 4A-4D show naked-eye observation of nanocarbon-iodine calcium alginate microspheres prepared in Embodiment 1. The microspheres appear as black particles settled at the bottom of a syringe. When the syringe was observed under a digital gastroenterology machine, a result indicated clear imaging; when the syringe was observed through DSA, a result indicated clear and granular imaging with uniform particle density; and when the syringe was placed near a femoral side for CT scanning, a result indicated clear imaging with density close to bone density.

FIGS. 6A-6B show CT imaging results of nanocarbon-iodine calcium alginate microspheres prepared in Embodiment 1 in blood vessels of an ex-vivo pig liver, where

FIGS. 7A-7D show CT imaging results of a rabbit in-vivo embolization experiment using nanocarbon-iodine calcium alginate microspheres prepared in Embodiment 1, where a control group uses biosphere embolic microspheres (300-500 μm).

FIGS. 8A-8E show results of a rabbit ear median artery embolization experiment using nanocarbon-iodine calcium alginate microspheres prepared in Embodiment 1. FIG. 8A. Pre-operation: A median artery of an ear of a rabbit was clearly imaged, with slender peripheral vessels showing natural course. FIG. 8B. Immediately post-operation: The median artery of the ear of the rabbit was clearly imaged with dilation, and black embolic microspheres were visible inside the median artery. Peripheral vessels were dilated and congested, with distal black embolic particles showing slightly distorted course. FIG. 8C. 24 hours post-operation: The median artery of the ear of the rabbit was clearly imaged with increased dilation. The black embolic microspheres were still visible inside the median artery. Dilation and congestion of the peripheral vessels were improved. Black embolic particles in capillaries demonstrated clearer course and natural distribution. FIG. 8D. 48 hours post-operation: The median artery of the ear of the rabbit was clearly imaged with reduced dilation. Fewer black embolic microspheres were visible inside the median artery. Dilation and congestion of the peripheral vessels disappeared. The black embolic particles in capillaries demonstrated clearer course, natural distribution, and fading coloration. FIG. 8E. 72 hours post-operation: The median artery of the ear of the rabbit was clearly imaged with further reduced dilation. No change was observed in the black embolic microspheres inside the median artery. Dilation of the peripheral vessels was decreased, and congestion disappeared. The black embolic particles in capillaries demonstrated optimal course clarity, natural distribution, and significant fading.

DETAILED DESCRIPTION OF THE EMBODIMENTS

In order to deepen the understanding of the invention, the invention will be further described in detail below in conjunction with embodiments and drawings. The embodiments are only used to explain the invention and do not constitute a limitation on the scope of the invention.

Nano carbon powder in the following embodiments was purchased from Suzhou Carbon Feng Graphene Technology Co., Ltd, with a particle size of 2-500 nm.

Embodiment 1 Preparation of Nanocarbon-Iodine Calcium Alginate Microspheres (1) 10 g of potassium iodide was weighed and placed in a container A.
(2) 1.5 g of sodium alginate was weighed and placed in the container A containing potassium iodide.
(3) 100 mL of double distilled water was added to the container A, so that potassium iodide (g):sodium alginate (g):water (mL)=10:1.5:100; and a solution in the container A was placed in a stirrer for stirring (100 r/min) overnight until sodium alginate was completely dissolved.
(4) 75 mg/mL of calcium chloride aqueous solution was prepared as a crosslinking agent, and was left to stand for 2 hours for use.
(5) 5 mL of anhydrous ethanol was drawn and placed in a container B, 0.5 g of nano carbon powder was weighed and placed in the container B, and formed a first suspension by using the nano carbon powder and anhydrous ethanol. The first suspension was added to the container A before preparation of the microspheres, so that potassium iodide (g):sodium alginate (g):water (mL):anhydrous ethanol (mL):the nano carbon powder (g)=10:1.5:100:5:0.5, and the components were stirred for more than 5 minutes to form a second suspension.
(6) The second suspension prepared in step (5) was placed in a 10 ml syringe, where an inner diameter of a needle of the syringe was 22 G-223 G.

The second suspension was injected into the calcium chloride aqueous solution in a stirring state that was prepared in step (4), where a stirring speed was about 500 r/min, an injection speed was about 5 mL/min, a distance between the needle of the syringe and a fluid level was controlled to be 25-50 cm, and injection was performed at a constant speed.

(7) After injection, stirring was continuously performed for 30 minutes. Calcium chloride-containing liquid was filtered out after microspheres were formed. The nanocarbon-iodine calcium alginate microspheres were flushed with double distilled water two times, liquid was filtered out, and the nanocarbon-iodine calcium alginate microspheres were reserved.
(8) The nanocarbon-iodine calcium alginate microspheres were placed in a vacuum lyophilizer and were dried (−55° C.) for more than 14 hours.
(9) The prepared microspheres were sieved by using a sieve with a diameter of 20-900 μm, to separately prepare microspheres with diameters of 20-900 μm.
(10) The sieved microspheres were sterilized through cobalt-60 irradiation for 30 minutes.

Embodiment 2 Preparation of Nanocarbon-Iodine Calcium Alginate Microspheres (1) 10 g of potassium iodide was weighed and placed in a container A.
(2) 1.2 g of sodium alginate was weighed and placed in the container A containing potassium iodide.
(3) 100 mL of double distilled water was added to the container A, so that potassium iodide (g):sodium alginate (g):water (mL)=10:1.2:100; and a solution in the container A was placed in a stirrer for stirring (100 r/min) overnight until sodium alginate was completely dissolved.
(4) 100 mg/mL of calcium chloride aqueous solution was prepared as a crosslinking agent, and was left to stand for 2 hours for use.
(5) 5 mL of propanol was drawn and placed in a container B, 0.5 g of nano carbon powder was weighed and placed in the container B, and formed a first suspension by using the nano carbon powder and anhydrous ethanol. The first suspension was added to the container A before preparation of the microspheres, so that potassium iodide (g):sodium alginate (g):water (mL):anhydrous ethanol (mL):the nano carbon powder (g)=10:1.2:100:5:0.5, and the components were stirred for more than 5 minutes to form a second suspension.
(6) The second suspension prepared in step (5) was placed in a 10 ml syringe, where an inner diameter of a needle of the syringe was 22 G-223 G.

The second suspension was injected into the magnesium chloride aqueous solution in a stirring state that was prepared in step (4), where a stirring speed was about 500 r/min, an injection speed was about 5 mL/min, a distance between the needle of the syringe and a fluid level was controlled to be 25-50 cm, and injection was performed at a constant speed.

(7) After injection, stirring was continuously performed for 30 minutes. Calcium chloride-containing liquid was filtered out after microspheres were formed. The nanocarbon-iodine calcium alginate microspheres were flushed with double distilled water two times, liquid was filtered out, and the nanocarbon-iodine calcium alginate microspheres were reserved.
(8) The nanocarbon-iodine calcium alginate microspheres were placed in a vacuum lyophilizer and were dried (−55° C.) for more than 14 hours.
(9) The prepared microspheres were sieved by using a sieve with a diameter of 20-900 μm, to separately prepare microspheres with diameters of 20-900 μm.
(10) The sieved microspheres were sterilized through cobalt-60 irradiation for 30 minutes.

Embodiment 3 Preparation of Nanocarbon-Iodine Calcium Alginate Microspheres (1) 10 g of potassium iodide was weighed and placed in a container A.
(2) 1.5 g of sodium alginate was weighed and placed in the container A containing potassium iodide.
(3) 100 mL of double distilled water was added to the container A, so that potassium iodide (g):sodium alginate (g):water (mL)=10:1.5:100; and a solution in the container A was placed in a stirrer for stirring (100 r/min) overnight until sodium alginate was completely dissolved.

(4) 120 mg/mL of calcium chloride aqueous solution was prepared as a crosslinking agent, and was left to stand for 2 hours for use.

(5) 5 mL of twain-80 was drawn and placed in a container B, 0.75 g of nano carbon powder was weighed and placed in the container B, and formed a first suspension by using the nano carbon powder and anhydrous ethanol. The first suspension was added to the container A before preparation of the microspheres, so that potassium iodide (g):sodium alginate (g):water (mL):anhydrous ethanol (mL):the nano carbon powder (g)=10: 1.5:100:5:0.75, and the components were stirred for more than 5 minutes to form a second suspension.

(6) The second suspension prepared in step (5) was placed in a 10 ml syringe, where an inner diameter of a needle of the syringe was 22 G-223 G.

The second suspension was injected into the zinc sulfate aqueous solution in a stirring state that was prepared in step (4), where a stirring speed was about 500 r/min, an injection speed was about 5 mL/min, a distance between the needle of the syringe and a fluid level was controlled to be 25-50 cm, and injection was performed at a constant speed.

(7) After injection, stirring was continuously performed for 30 minutes. Calcium chloride-containing liquid was filtered out after microspheres were formed. The nanocarbon-iodine calcium alginate microspheres were flushed with double distilled water two times, liquid was filtered out, and the nanocarbon-iodine calcium alginate microspheres were reserved.

(8) The nanocarbon-iodine calcium alginate microspheres were placed in a vacuum lyophilizer and were dried (−55° C.) for more than 14 hours.

(9) The prepared microspheres were sieved by using a sieve with a diameter of 20-900 μm, to separately prepare microspheres with diameters of 20-900 μm.

(10) The sieved microspheres were sterilized through cobalt-60 irradiation for 30 minutes.

Figure 1A:
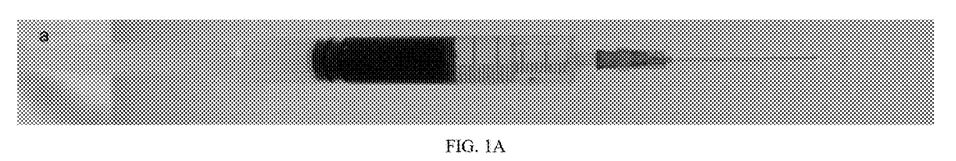
FIGS. 1A-1D show optical morphologies of nanocarbon-iodine calcium alginate microspheres prepared in Embodiment 1.
Figure 1B:
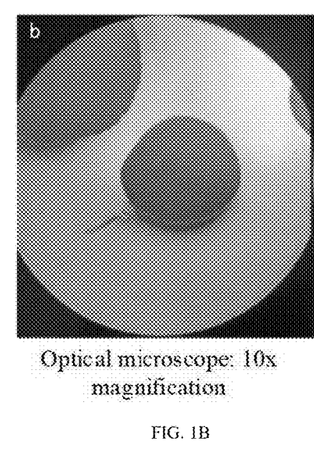
Figure 1C:
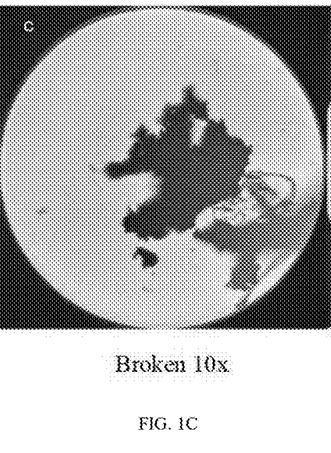
Figure 1D:
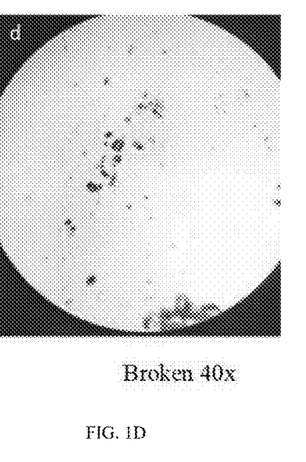
Figure 2:
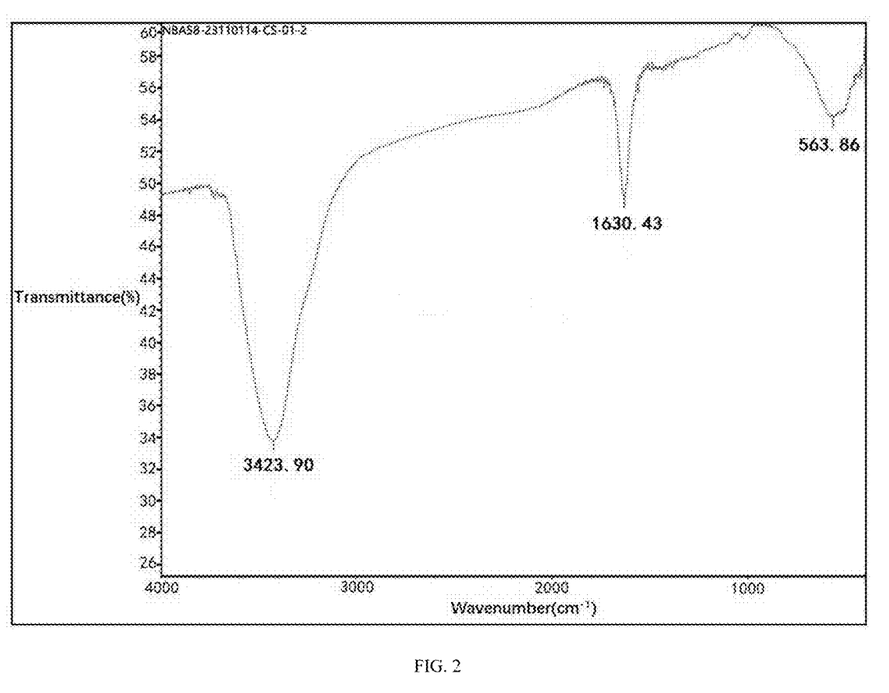
FIG. 2 shows a Fourier transform infrared spectroscopy spectrum of nanocarbon-iodine calcium alginate microspheres prepared in Embodiment 1.

Characterization and Testing (1) Particle sizes and shapes of the microspheres were measured using a micrometer under an optical microscope, as shown in FIGS. 1A-1D. FIGS. 1A-1D show morphologies of the nanocarbon-iodine calcium alginate microspheres prepared in Embodiment 1 under the optical microscope. FIG. 1A is a macroscopic observation image of the prepared nanocarbon-iodine calcium alginate microspheres placed in a 5 mL syringe. An overall color of the calcium alginate microspheres in the image is black, which is the same as a color of carbon powder; and no free carbon powder is observed in a solution in the syringe. FIG. 1B is a 10× magnification image captured under the optical microscope. When observation is performed under the optical microscope with a magnification factor of 10×, the microsphere in the morphology image a of the microsphere is broken in a pulling manner to observe a morphology of the carbon powder. FIG. 1C is a 40× magnification image of FIG. 1B. FIGS. 1C-1D show that the carbon powder is tightly bound to calcium alginate, and show a morphology in which the carbon powder is encapsulated in calcium alginate after the microsphere is broken.

(2) The prepared microspheres were detected by using a Fourier transform infrared spectrometer: A result showed that there were specific absorption peaks when specific peak values were 3423.9, 1630.43, and 563.86.

Figure 3:
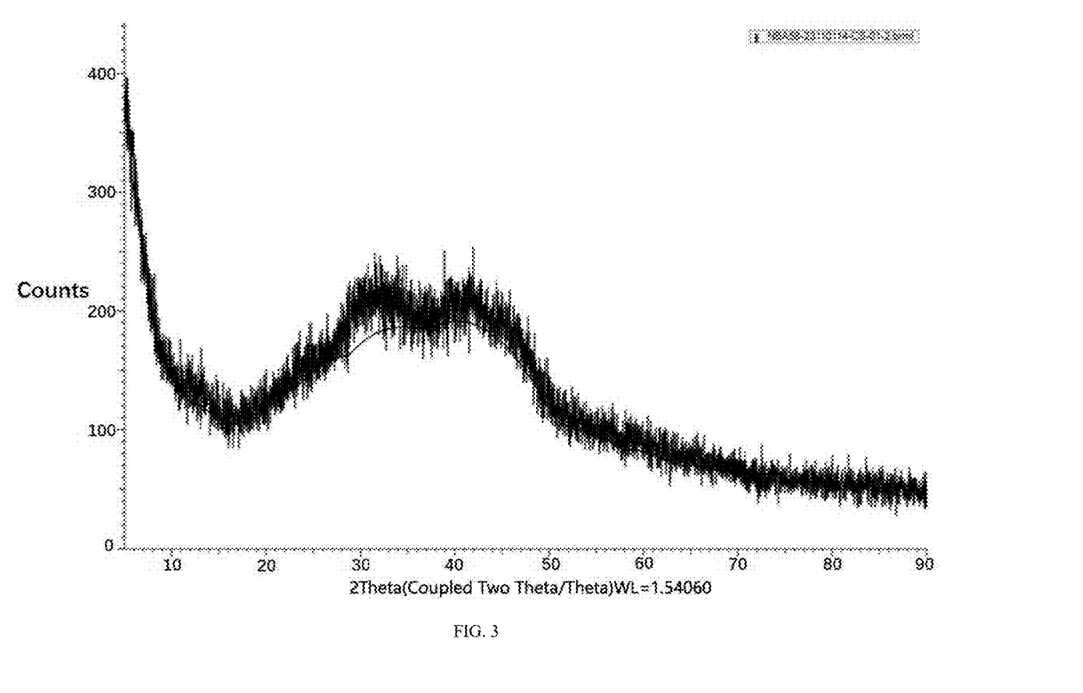
FIG. 3 shows an X-ray diffraction pattern of nanocarbon-iodine calcium alginate microspheres prepared in Embodiment 1.
Figure 4A:
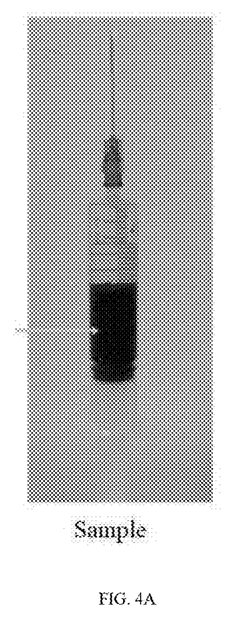
Figure 4B:
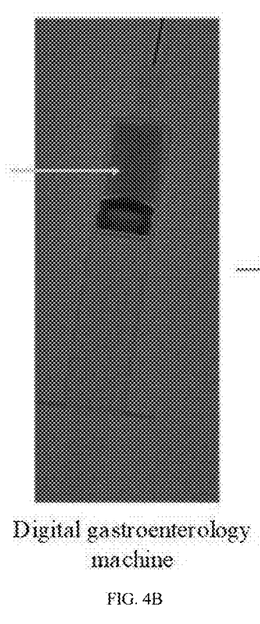
Figure 4C:
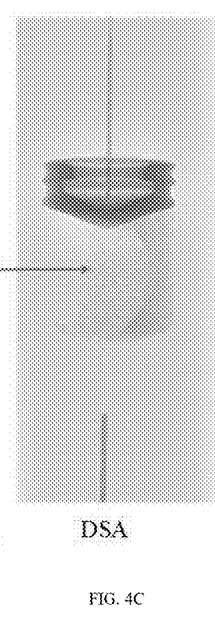
Figure 4D:
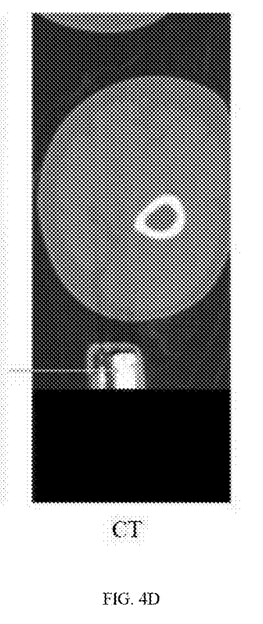

(3) The prepared microspheres were detected by using an X-ray diffractometer. A result is shown in FIG. 3. The result showed a mixed morphology, with a smooth curve at the bottom considered to represent a crystal structure of nanocarbon, which aligns with design expectations.

(4) Tests for an iodine loading mount, a carbon loading amount, a carbon encapsulation efficiency, an iodine encapsulation efficiency, and a water absorption efficiency Test methods are as follows:

Encapsulated I=total I−unencapsulated I, the iodine encapsulation efficiency %=encapsulated I/total I*100%. The calculation was performed three times, and an average value was taken. A 1.5% (a concentration unit was 1.5 g/100 mL) starch indicator, a sodium thiosulfate titration solution (0.1 mol/L), and 500 mL of 7.5% calcium chloride solution (7.5 g/100 mL) were separately prepared. Both a nanocarbon-iodine sodium alginate solution and a rinse solution used during the injection procedure in Embodiment 1 were collected as a mixed solution, and the unencapsulated nanocarbon-iodine sodium alginate solution and the rinse solution were separately weighed. The mixed solution is titrated with the prepared sodium thiosulfate titration solution (0.1 mol/L) until a reaction was about to end, then 2 mL of starch indicator was added, and the mixed solution was continuously titrated with the prepared sodium thiosulfate titration solution until a blue color disappears. Each 1 mL of sodium thiosulfate titration solution (0.1 mol/L) is equivalent to 12.69 mg of $I_2$, which is used to calculate an amount of iodine not encapsulated in the calcium alginate microspheres. The measurement was performed three times, and an average value was taken.

0.3 g of freeze-dried nanocarbon-iodine calcium alginate microsphere powder was weighed by using a balance and the power is placed in three different beakers with each containing 0.1 g of nanocarbon-iodine calcium alginate microspheres. The calcium alginate microspheres were dissolved using a 3% sodium citrate solution to release iodine. The sodium thiosulfate solution was used for titration, and the 1.5% starch indicator was used for titration for color development in the end. An iodine content was calculated using the sodium thiosulfate solution. Iodine loading efficiency %=iodine/total nanocarbon-iodine calcium alginate microspheres*100%, and an average value of three times of measurement was taken.

Carbon encapsulation efficiency determination: A 2.5 mL syringe was weighed, 2 mL of prepared nanocarbon-iodine sodium alginate solution was drawn, the syringe and the nanocarbon-iodine sodium alginate solution were weighed together, and a weight of the syringe was subtracted from a total weight to obtain a weight of the nanocarbon-iodine sodium alginate solution. The microspheres were prepared by using the solution in the syringe and repeatedly flushed with normal saline, and centrifuged after being left to stand. Unencapsulated carbon powder floated on the fluid level and was black, and clarified liquid below the carbon powder was discarded. The floating substance was collected and dried, and weighed after being freeze-dried, to obtain the unencapsulated carbon powder. Encapsulated carbon=total carbon−unencapsulated carbon. Carbon encapsulation efficiency %=encapsulated carbon/total carbon*100%. The experiment was repeated three times and an average value of measurement results was taken.

Determination method of a carbon loading efficiency: 2 mL of prepared nanocarbon-iodine sodium alginate solution was drawn for microsphere preparation; a syringe was flushed three times with calcium chloride after preparation to ensure all sodium alginate was converted into calcium alginate; the prepared nanocarbon-iodine calcium alginate microspheres were centrifuged, the microspheres were freeze-dried after liquid was discarded, and then the nanocarbon-iodine calcium alginate microspheres were weighed. Because the carbon encapsulation efficiency was close to 100%, an amount of carbon in the solution corresponded to an amount of carbon loaded into the microspheres. Carbon loading efficiency=carbon/total nanocarbon-iodine calcium alginate microspheres*100%, and an average value of three times of measurement was taken.

An empty penicillin bottle was weighed, and the microspheres prepared in Embodiment 1 were placed in the penicillin bottle. The penicillin bottle was placed on a filter paper upside down to absorb any excess water, and then the penicillin bottle was weighed again. A weight of the empty penicillin bottle was subtracted from a total weight to obtain a wet weight (B). The weighed penicillin bottle was freeze-dried, and was weighed again after freeze-drying. The weight of the empty penicillin bottle was subtracted from a total weight to obtain a dry weight (G). A water swelling ratio was calculated based on the wet weight and the dry weight, the calculation was repeated three times, and an average value was taken.

The nanocarbon-iodine calcium alginate microspheres prepared in Embodiment 1 had an average iodine encapsulation efficiency of 70.31±1.08%, an iodine loading efficiency of 44.7%, an average nanocarbon encapsulation efficiency of 98.0%, a carbon loading efficiency of 30.99%; and an average water absorption efficiency of 1070%.

The nanocarbon-iodine calcium alginate microspheres prepared in Embodiment 2 had an average iodine encapsulation efficiency of 60.59±2.10%, an iodine loading efficiency of 38.5%, an average nanocarbon encapsulation efficiency of 98.5%, a carbon loading efficiency of 39.99%; and an average water absorption efficiency of 1120%.

The nanocarbon-iodine calcium alginate microspheres prepared in Embodiment 3 had an average iodine encapsulation efficiency of 65.42±3.10%, an iodine loading efficiency of 43.3%, an average nanocarbon encapsulation efficiency of 98.3%, a carbon loading efficiency of 33.01%; and an average water absorption efficiency of 1221%.

(5) Imaging performance detection

Imaging performance detection of the microspheres: 5 mL of prepared nanocarbon-iodine calcium alginate microsphere suspension was placed under a digital gastroenterology machine for observation, was placed under a DSA machine for observation, and was placed on a femoral side for observation. Clinical X-ray fluoroscopy mode (80 kVp voltage, 529 mA current, 65 ms delay, 7 frames per second), standard Allura Xper image processing, and X-ray photography mode (120 kVp, 350 mA, 0.5 mm collimator, field of view (FOV) 22×22 cm) were used. As shown in FIGS. 4A-4D, in a naked-eye image, the nanocarbon-iodine calcium alginate microsphere suspension contains black particles; when the suspension was placed under the digital gastroenterology machine for imaging, a result indicated clear imaging; when the suspension was used for imaging through DSA, granular and clear imaging of the microspheres was implemented; and when the suspension was placed outside a human body for imaging through CT, clear imaging was implemented with density close to bone density and obviously higher than muscle density.

(6) Ex-vivo liver experiment

Figure 5:
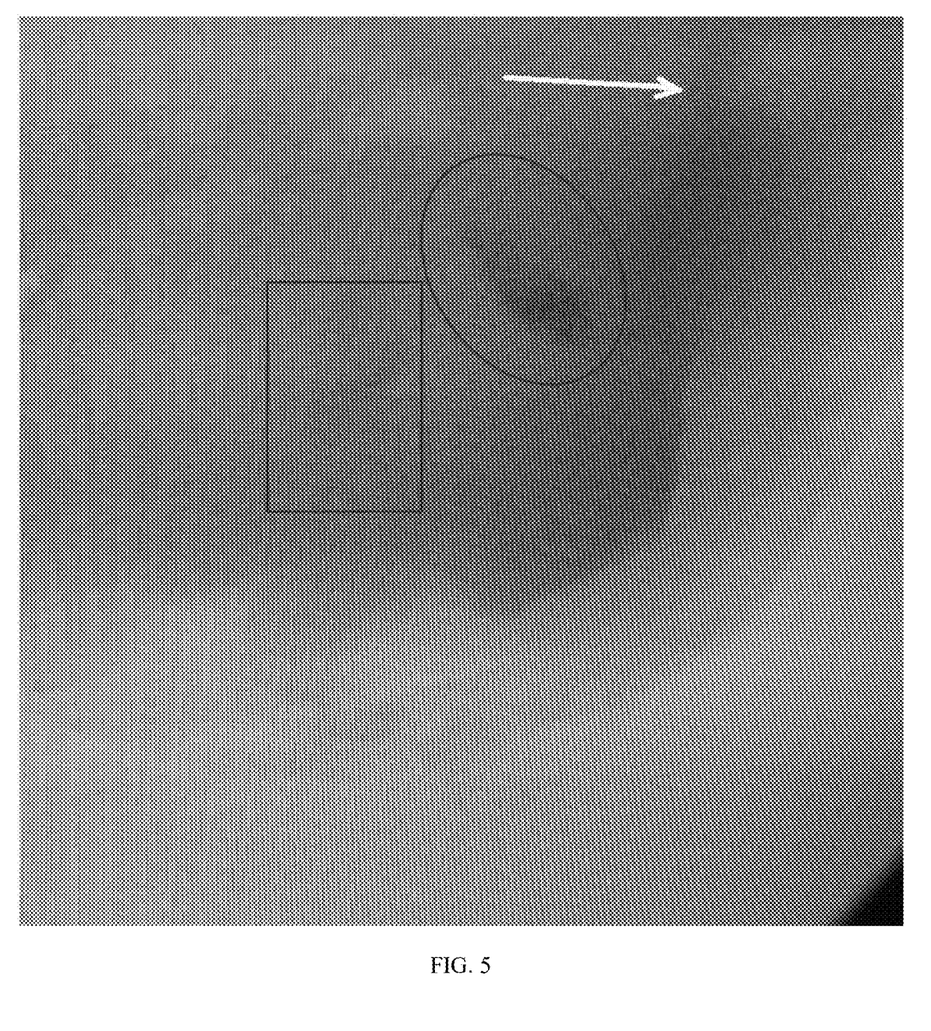
FIG. 5 is an ex-vivo liver imaging image of nanocarbon-iodine calcium alginate microspheres prepared in Embodiment 1. A square part represents an imaging result after 0.1 mL of microspheres and 1 mL of 0.9 sodium chloride solution are injected through a syringe, a circular part represents an imaging result after 0.2 mL of microspheres and 1 mL of 0.9 sodium chloride solution are injected through the syringe, and an arrow represents a control group. It can be seen from the image that 0.1 mL of microspheres results in faint imaging and 0.2 mL of microspheres results in clear imaging, which means that imaging resolution is improved as a concentration increases.

A piece of commercially available pig liver, one syringe, and an appropriate amount of heparin saline were taken. The commercially available pig liver was first repeatedly flushed with heparin saline through the portal vein and the hepatic artery to remove blood clots, and then set aside for use. 0.1 g/mL of nanocarbon-iodine calcium alginate microspheres were suspended in 1.2 mL of normal saline and injected into a part of parenchyma of the pig liver; an equal volume of commercially available BIOSPHERE 300 μm-500 μm microspheres were injected into another part of parenchyma of the pig liver, and imaging effects were observed under a DSA machine. As shown in FIG. 5, the nanocarbon-iodine calcium alginate microspheres served as experimental groups, where a square marker represents imaging of 0.1 g of nanocarbon-iodine calcium alginate microspheres in the pig liver and a circular marker represents imaging of 0.2 g of nanocarbon-iodine calcium alginate microspheres in the pig liver. The 0.1 g group was visible, while the 0.2 g group was clearly visible, which means that imaging resolution was improved as a dosage increases. A control group (represented by an arrow) was not imaged.

Figure 6A:
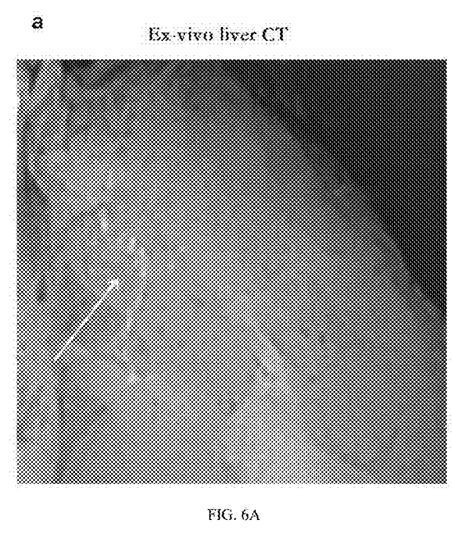
FIG. 6A represents a horizontal plane image, and in a horizontal plane, high-density granular imaging is implemented following the vascular pathway, with granular imaging implemented in distal vessels.
Figure 6B:
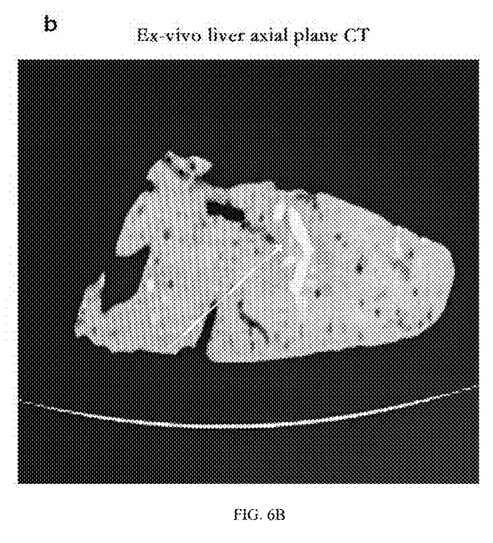
FIG. 6B represents an axial plane image, and in an axial plane, high-density imaging is implemented along the vascular pathway, accompanied by granular and linear distributions of embolic particle imaging results in the periphery.

0.1 g/mL of prepared nanocarbon-iodine calcium alginate microspheres, a piece of commercially available pig liver, one syringe, and an appropriate amount of heparin saline were taken. The commercially available pig liver was first repeatedly flushed with heparin saline through the portal vein and the hepatic artery to remove blood clots, and then set aside for use. 0.1 g of nanocarbon-iodine calcium alginate microspheres were suspended in 1 mL of normal saline and injected into a part of parenchyma of the pig liver; an equal volume of commercially available BIOSPHERE 300 μm-500 μm microspheres were injected into another part of parenchyma of the pig liver, and imaging effects were observed under a CT machine. Results are shown in FIGS. 6A-6B. FIG. 6A is a localization image of the nanocarbon-iodine calcium alginate microspheres in the ex-vivo pig liver, which indicates high-density granular imaging along the vessels; and FIG. 6B shows an axial plane, with a result indicating high-density imaging of the microspheres.

(7) Application of the nanocarbon-iodine calcium alginate microspheres (rabbit in-vivo imaging experiment and rabbit ear median artery embolization experiment)

Rabbit in-vivo experiment: Adult, female New Zealand albino rabbit (Nanjing Drum Tower Hospital Animal Experiment Center), weighing 4.0-5.0 kg, and used with the approval of the Nanjing Drum Tower Hospital Animal Ethics Committee. Food and water were provided ad libitum. The prepared microspheres were separately injected into the liver, lung, and heart of the rabbit to observe imaging results thereof, with results shown in FIGS. 7A-7D.

Figure 7A:
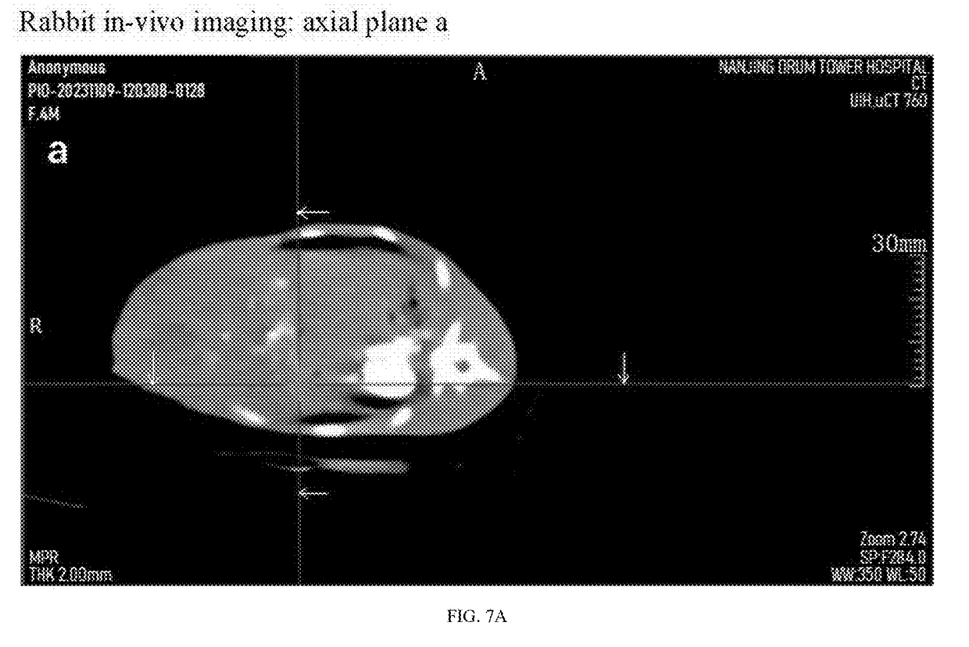
FIG. 7A represents an axial plane, where high-density imaging is implemented in the liver and heart regions.
Figure 7B:
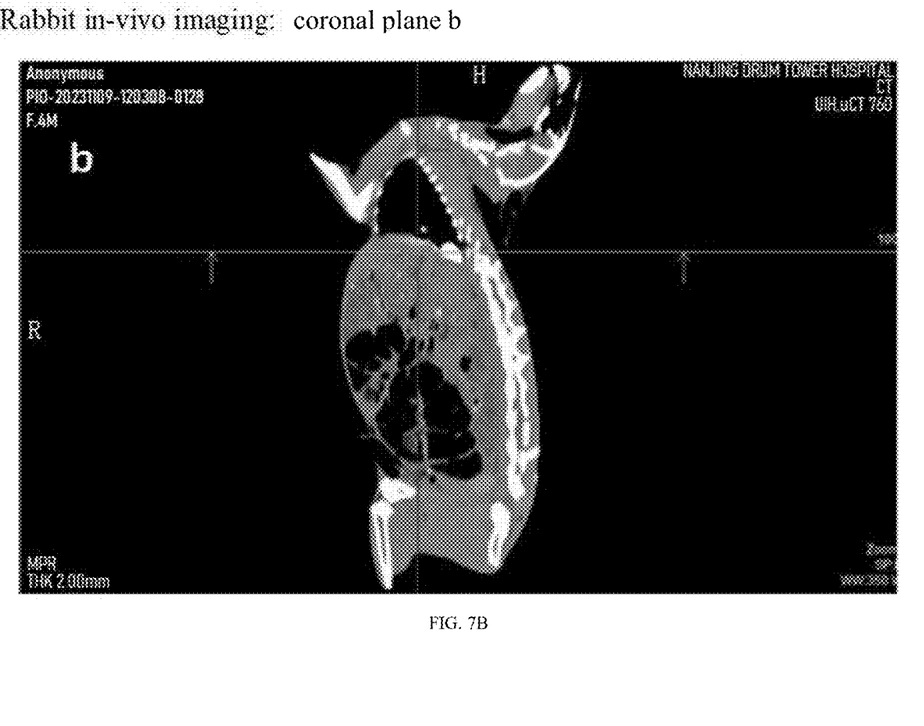
FIG. 7B is a coronal plane image, where patchy high-density imaging is implemented in the thoracic cavity.
Figure 7C:
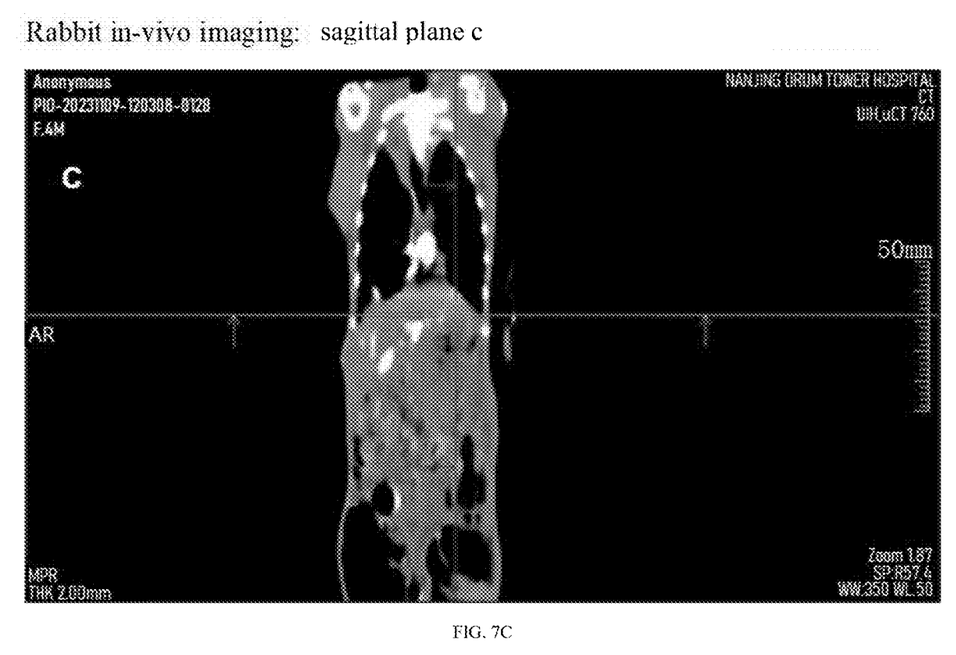
FIG. 7C is a sagittal plane image, where clear high-density imaging is implemented in the mediastinum, thoracic cavity, liver, and abdominal cavity.
Figure 7D:
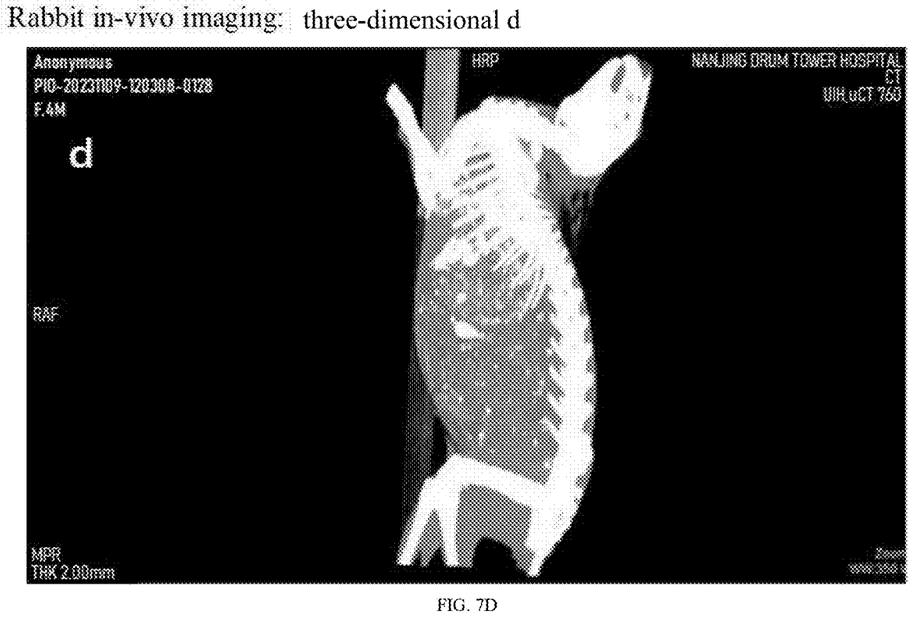
FIG. 7D is an image after three-dimensional adjustment, where high-density imaging is implemented in the thoracic and abdominal cavities with density close to bone density. The foregoing results demonstrate that the nanocarbon-iodine calcium alginate microspheres exhibit good CT imaging performance.
Figure 8A:
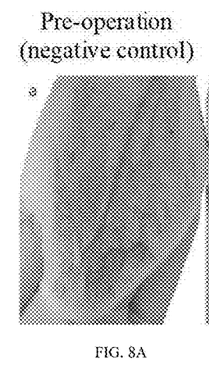
Figure 8B:
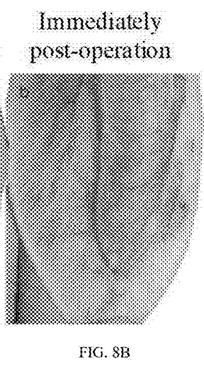
Figure 8C:
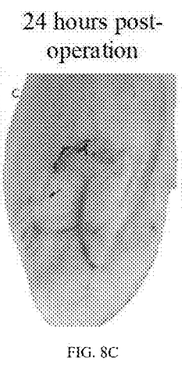
Figure 8D:
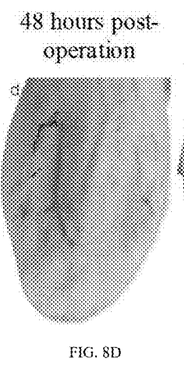
Figure 8E:
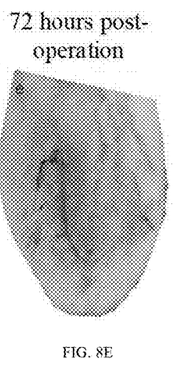

Imaging observation was performed for the experiment object from different perspectives (FIGS. 7A-7D): FIG. 7A: axial plane; FIG. 7B: coronal plane; FIG. 7C: sagittal plane; and FIG. 7D: three-dimensional imaging. CT scanning conditions: CT, tube voltage 120 KV, tube current 90 mA, scanning range covering the whole body, and three-dimensional image reconstruction being performed after scanning. It was proved through the rabbit in-vivo CT experiment that imaging may be implemented in the liver, thoracic cavity, heart, and gastrointestinal tract. Before an operation, ears of the rabbit were shaved, the rabbit was placed on an operating table after anesthesia. The median artery of each of the ears of the rabbit was selected as a puncture observation point and was disinfected. A coaxial needle was used to puncture into the median artery of each ear. One ear was injected with positive control microspheres (BIOSPHERE 300-500 μm microspheres, serving as a control group), while the other ear was injected with nanocarbon-iodine calcium alginate microspheres (serving as an experimental group). A total injection amount was 1 mL with 0.1 mL of microspheres and a 0.9 sodium chloride suspension. It was proved through the rabbit ear median artery embolization experiment that the microspheres had a good embolization effect, as shown in FIGS. 8A-8E. FIG. 8A. Pre-operation: The median artery of the ear of the rabbit was clearly imaged, with slender peripheral vessels showing natural course. FIG. 8B. Immediately post-operation: The median artery of the ear of the rabbit was clearly imaged with dilation, and black embolic microspheres were visible inside the median artery. Peripheral vessels were dilated and congested, with distal black embolic particles showing slightly distorted course. FIG. 8C. 24 hours post-operation: The median artery of the ear of the rabbit was clearly imaged with increased dilation. The black embolic microspheres were still visible inside the median artery. Dilation and congestion of the peripheral vessels were improved. Black embolic particles in capillaries demonstrated clearer course and natural distribution. FIG. 8D. 48 hours post-operation: The median artery of the ear of the rabbit was clearly imaged with reduced dilation. Fewer black embolic microspheres were visible inside the median artery. Dilation and congestion of the peripheral vessels disappeared. The black embolic particles in capillaries demonstrated clearer course, natural distribution, and fading coloration. FIG. 8E. 72 hours post-operation: The median artery of the ear of the rabbit was clearly imaged with further reduced dilation. No change was observed in the black embolic microspheres inside the median artery. Dilation of the peripheral vessels was decreased, and congestion disappeared. The black embolic particles in capillaries demonstrated optimal course clarity, natural distribution, and significant fading.

The described above are merely preferred embodiments of the invention and not intended to limit the invention. Any of modifications, equivalent substitutions, improvements, etc. made within the spirit and principle of the invention shall be covered in the scope of the invention.

What is claimed is:

1. A preparation method of a nanocarbon-iodine calcium alginate microsphere, comprising:
   (1) preparing an iodine-containing sodium alginate aqueous solution;
   (2) preparing a crosslinking agent aqueous solution;
   (3) preparing a first suspension formed by a nano carbon powder and a liquid, and mixing and stirring the first suspension with the iodine-containing sodium alginate aqueous solution prepared in the step (1), to form a second suspension;
   (4) placing the second suspension obtained in the step (3) in a syringe, and injecting the second suspension into the crosslinking agent aqueous solution prepared in the step (2), to obtain the nanocarbon-iodine calcium alginate microsphere, wherein the crosslinking agent aqueous solution is in a stirring state;
   (5) filtering and drying the nanocarbon-iodine calcium alginate microsphere obtained in the step (4) to obtain a dried microsphere; and
   (6) sieving the dried microsphere obtained in the step (5) to obtain a sieved microsphere and sterilizing the sieved microsphere through a cobalt-60 irradiation;
   wherein the iodine-containing sodium alginate aqueous solution is a solution obtained by dissolving potassium iodide and sodium alginate in water, a mass ratio of the potassium iodide to the sodium alginate is (5-10):(0.1-2.0), and a mass concentration of the iodine-containing sodium alginate aqueous solution is 10-20 mg/mL.

2. The preparation method according to claim 1, wherein an iodine loading efficiency of the nanocarbon-iodine calcium alginate microsphere is 35% to 50%, and a carbon loading efficiency of the nanocarbon-iodine calcium alginate microsphere is 30% to 50%.

3. The preparation method according to claim 1, wherein the liquid is one or more of the water, anhydrous ethanol, propanol, or tween-80.

4. The preparation method according to claim 1, wherein a crosslinking agent in the crosslinking agent aqueous solution is a bivalent metal cationic compound, and is selected from one or more of magnesium chloride, zinc chloride, copper chloride, barium chloride, ferrous sulfate, magnesium sulfate, zinc sulfate, calcium chloride, calcium hypochlorite, calcium bromide, or calcium iodide.

5. The preparation method according to claim 1, wherein a mass concentration of the crosslinking agent aqueous solution is 20-150 mg/mL.

6. The preparation method according to claim 1, wherein a mass of the nano carbon powder in each mL of the first suspension is 0.05-0.15 g; and a mass ratio of the sodium alginate to the nano carbon powder in the second suspension is (2-3):1.

7. The preparation method according to claim 1, wherein a particle size of the nano carbon powder is 2-500 nm.

* * * * *